US011469782B2

(12) United States Patent
González Rodríguez et al.

(10) Patent No.: US 11,469,782 B2
(45) Date of Patent: Oct. 11, 2022

(54) COMMUNICATION SYSTEM AND METHOD FOR EQUIPMENT IN AIRBORNE OPERATIONS

(71) Applicant: Airbus Defence and Space SAU, Getafe (ES)

(72) Inventors: Manuel González Rodríguez, Getafe (ES); Andrés Jiménez Olazábal, Getafe (ES); Gonzalo Martín Gómez, Getafe (ES)

(73) Assignee: Airbus Defence and Space SAU, Getafe (ES)

( * ) Notice: Subject to any disclaimer, the term of this patent is extended or adjusted under 35 U.S.C. 154(b) by 0 days.

(21) Appl. No.: 17/356,931

(22) Filed: Jun. 24, 2021

(65) Prior Publication Data
US 2021/0409045 A1 Dec. 30, 2021

(30) Foreign Application Priority Data

Jun. 26, 2020 (EP) .................................... 20382567

(51) Int. Cl.
| | |
|---|---|
| *H04L 5/12* | (2006.01) |
| *H04L 23/02* | (2006.01) |
| *H04B 1/04* | (2006.01) |
| *H04W 76/15* | (2018.01) |
| *H04B 7/185* | (2006.01) |
| *H04L 27/20* | (2006.01) |

(52) U.S. Cl.
CPC ....... *H04B 1/0483* (2013.01); *H04B 7/18502* (2013.01); *H04L 27/2017* (2013.01); *H04W 76/15* (2018.02)

(58) Field of Classification Search
CPC .............. H04B 1/0483; H04B 7/18502; H04L 27/2017; H04W 76/15; B64D 39/00
USPC ......................................................... 375/262
See application file for complete search history.

(56) References Cited

U.S. PATENT DOCUMENTS

| | | | |
|---|---|---|---|
| 5,185,700 A | 2/1993 | Bezos et al. | |
| 8,428,162 B2 * | 4/2013 | Forenza ................ | H04L 1/0057 375/296 |
| 10,187,232 B1 * | 1/2019 | Ma ......................... | H04L 27/20 |
| 2014/0158829 A1 | 6/2014 | Abad | |
| 2015/0249498 A1 | 9/2015 | Minguez Rascon et al. | |

(Continued)

FOREIGN PATENT DOCUMENTS

| | | |
|---|---|---|
| EP | 2738097 A1 | 6/2014 |
| EP | 2879312 A1 | 6/2015 |
| WO | 2018104929 A1 | 6/2018 |

OTHER PUBLICATIONS

European Search Report; priority document.

*Primary Examiner* — Tanmay K Shah
(74) *Attorney, Agent, or Firm* — Greer, Burns & Crain, Ltd.

(57) ABSTRACT

A communication system for equipment in airborne operations comprising: at least one first double transceiver and at least one second double transceiver, wherein the at least one first double transceiver is configured to send data to the at least one second double transceiver in two redundant main channels and wherein the data to be sent through each redundant main channel is first compared with each other so as to ensure that the data sent through a first main channel is the same data sent through a second main channel.

17 Claims, 3 Drawing Sheets

(56) References Cited

U.S. PATENT DOCUMENTS

| | | | |
|---|---|---|---|
| 2016/0066271 A1* | 3/2016 | Hong | H04W 76/38 |
| | | | 370/311 |
| 2017/0220517 A1* | 8/2017 | Khan | H04L 49/35 |
| 2019/0306875 A1* | 10/2019 | Zhou | H04W 72/1284 |
| 2019/0364492 A1* | 11/2019 | Azizi | H04W 68/005 |
| 2019/0385057 A1 | 12/2019 | Litichever et al. | |

* cited by examiner

FIG.3

COMMUNICATION SYSTEM AND METHOD FOR EQUIPMENT IN AIRBORNE OPERATIONS

CROSS-REFERENCES TO RELATED APPLICATIONS

This application claims the benefit of the European patent application No. 20382567.4 filed on Jun. 26, 2020, the entire disclosures of which are incorporated herein by way of reference.

FIELD OF THE INVENTION

The present invention is directed to a system and a method for transmitting information between pieces of equipment involved in airborne operations, especially in airborne refueling operations. More particularly, the invention relates to a system and a method both for powering sensors and actuators located in the tip of the flying boom (in the case of boom-type refueling) or in the tip of the hose, i.e., the drogue (in the case of the probe-and-drogue-type refueling) and for sending/receiving critical information between the transmitters/receivers located on board the tanker aircraft to/from the sensors and actuators located in the drogue or in the tip of the flying boom.

This invention is applicable in the field of flight communication systems, especially for those systems which operate in fuel environments.

BACKGROUND OF THE INVENTION

There are currently two main systems and methods for refueling an aircraft while it is in the air.

On the one hand, there is the so-called "boom system" which involves the use of a rigid mast or "boom" which has flying control surfaces at its tip. These flying control surfaces are driven by a boom operator. The boom operator is located at the tanker (i.e., the aircraft supplying the fuel) and usually controls the flying control surfaces by means of a joystick.

On the other hand, there is the POD system (also called "probe-and-drogue system") which involves the launching of a flexible hose which has a drogue at its tip. The drogue serves as a stabilizer during the approaching maneuver of the hose towards the aircraft to be refueled. The aircraft to be refueled extends or deploys a probe which must fit into a valve located at the bottom of the drogue. While the hose and drogue are in the retracted position, they are held within a pod of the tanker.

Both the boom tip (with its control surfaces and its valve to be fitted inside a receptacle of the aircraft to be refueled) and the drogue incorporate several sensors and actuators which have to be powered. Usually, this powering is achieved by means of wiring transmitting the necessary power for feeding them from the tanker to the sensors and actuators. There are also data cables for transmitting and receiving information between the sensors and actuators and the tanker.

The correct performance of the complete refueling system and, particularly, of the sensors and actuators, is considered critical for warrantying the safety of both persons and equipment. Therefore, the whole refueling system is classified according to "Design Assurance Level" DAL A class.

Due to the hazardous fuel environment (which is prone to cause explosions in case of an overheating of the wires or in case of any sparks or electric discharge occurring between the wires and the fuselage of the aircraft to be refueled), Boom systems require special and isolated wires to be able to power and communicate sensors and actuators from the mobile part of BOOM to the central computer place in the fixed part of system at the tanker. This philosophy implies a complex guiding and fuel isolating systems to perform the powering and communication activities in a secure way. Moreover, due to the nature of the flexible hose in POD refueling operations, it is not recommended to arrange sensors/actuators in the drogue that imply data transmission and powering through electric cables, for which current POD systems lack this equipment.

SUMMARY OF THE INVENTION

With the aim of providing a solution to the abovementioned problems, the present invention refers to a communication system and method for equipment in airborne operations, especially in boom and POD airborne refueling operations.

The communication system for equipment in airborne operations, which is object of the present invention, comprises at least one first double transceiver and at least one second double transceiver.

The at least one first double transceiver comprises a first emitting module and a second emitting module.

The first emitting module comprises a control submodule, a first radio frequency submodule and an antenna.

The second emitting module comprises a monitoring submodule, a second radio frequency submodule and an antenna.

The first emitting module is configured to transmit data thorough a first main channel and the second emitting module is configured to transmit the same data through a second main channel.

The control submodule is bidirectionally connected to the monitoring submodule for checking whether the data to be transmitted by the first emitting module matches with the data to be transmitted by the second emitting module.

The at least one first double transceiver is configured to discard the data without sending it through the first main channel and through the second main channel if the data to be transmitted by the first emitting module does not match with the data to be transmitted by the second emitting module.

The at least one second double transceiver comprises a first receiving module and a second receiving module.

The first receiving module comprises a control subblock, a first radio frequency subblock and an antenna.

The second receiving module comprises a monitoring subblock, a second radio frequency subblock and an antenna.

The first receiving module is configured to receive data thorough the first main channel and the second receiving module is configured to receive data through the second main channel.

The control subblock is bidirectionally connected to the monitoring subblock for checking whether the data received by the first receiving module matches with the data received by the second receiving module.

The at least one second double transceiver is configured to discard the data received through the first main channel and through the second main channel without processing it (i.e., without forwarding the data to a corresponding computer or to a corresponding aircraft actuator), if the data received by the first receiving module does not match with the data received by the second receiving module.

Due to the communication system described above, with its control/monitoring architecture, the communication system is suitable for DAL A critical airborne operations. The data are sent in two redundant main channels and the data are verified within the first double transceiver before sending it and within the second double transceiver upon reception of the data through the first main channel and through the second main channel.

Moreover, the above described communication system is suitable for fuel environments in which wire communications may involve fire risk.

Due to this strategy of sending the data through two redundant channels, eventual jammers are prevented.

In a possible embodiment of the invention, the at least one first double transceiver may incorporate a first receiving module and a second receiving module. In an analogue manner, the at least one second double transceiver may incorporate a first emitting module and a second emitting module. This configuration allows the first double transceiver to further receive data from the second double transceiver.

According to a preferred embodiment of the invention, the first double transceiver and the second double transceiver are configured to operate at a frequency of between 2.4 GHz and 2.5 GHz.

According to a further embodiment of the invention, the first emitting module and the second emitting module are configured to respectively send the data to the first receiving module and to the second receiving module through the corresponding first main channel and second main channel by splitting, within each main channel, logic 0's and 1's into two different subchannels.

According to a possible embodiment of the invention, the first emitting module and the second emitting module are connected to respective sensors (e.g., pressure sensors in an airborne refueling system) for measuring one and the same magnitude (e.g., fuel pressure).

Furthermore, according to a possible embodiment of the invention, the first receiving module and the second receiving module are connected to an actuator in an aircraft (e.g., an actuator configured to actuate a valve allowing the passage of fuel from a tanker aircraft to another aircraft which needs to be refueled).

The at least one first double transceiver and/or the at least one second double transceiver may also be connected to a central computer in an aircraft.

According to a possible embodiment of the invention, the communication system comprises one or more energy storage modules for providing energy to the at least one first double transceiver and/or to the at least one second double transceiver and/or to a sensor in an aircraft, and/or to an actuator in an aircraft. The one or more energy storage modules are configured to be recharged when the communication system is not in use (e.g., when the aircraft is landed and/or when the POD or BOOM refueling systems are not in use).

The abovementioned feature allows the communication system and/or the sensors and/or the actuators to be powered without the need of power cables extending among a fuel environment (which would entail a risk of fire and/or explosion).

According to a possible embodiment, each energy storage module comprises a plurality of ultra-capacitors.

According to a possible embodiment of the invention, the first emitting module and the second emitting module of the first double transceiver (and/or of the second double transceiver) comprise:

a first FPGA unit of either the control submodule or the monitoring submodule, wherein the emitter FPGA module is connected to;
a digital-to-analogue converter of either the control submodule or the monitoring submodule, wherein the digital-to-analogue converter is connected to;
a first voltage-controlled oscillator unit of the radio frequency submodule, wherein the first voltage-controlled oscillator is connected to;
two variable-gain amplifiers (which may be connected in parallel) of the radio frequency submodule, wherein the two variable-gain amplifiers are connected to;
an antenna.

Furthermore, the first receiving module and the second receiving module of the second double transceiver (and/or of the first double transceiver) comprise:

an antenna, wherein the antenna is connected to;
a low-pass filter of the radio frequency subblock, wherein the low-pass filter is connected to;
two low-noise amplifiers (which may be connected in parallel) of the radio frequency subblock, wherein the two low-noise amplifiers are connected to;
a mixer (e.g., a downconverter) of the radio frequency subblock, wherein the mixer is configured to receive an LO signal from an amplifying unit to which it is connected, and wherein the mixer is further connected to;
a tuned amplifier of the radio frequency subblock, wherein the tuned amplifier is connected to;
an envelope detector of the radio frequency subblock, wherein the envelope detector is connected to;
an analogue-to-digital converter of either the control subblock or the monitoring subblock, wherein the analogue-to digital converter is connected to;
a second FPGA module of either the control subblock or the monitoring subblock, wherein the second FPGA module is connected to;
a second voltage-controlled oscillator unit, wherein the second voltage-controlled oscillator unit is connected to;
the amplifying unit.

According to a possible embodiment of the invention, within each first double transceiver, the digital-to-analogue converter of either the control submodule or the monitoring submodule, is connected to the first voltage-controlled oscillator unit of the radio frequency submodule through a GFSK submodule.

The abovementioned feature allows for a reduction in the noise in the output of the first voltage-controlled oscillator unit, thanks to a smoothing effect of the GFSK submodule in the signal to be input to the first voltage-controlled oscillator unit.

The present invention further refers to a communication method for equipment in airborne operations.

The communication method for equipment in airborne operations comprises utilizing the communication system for equipment in airborne operations described above.

Furthermore, the communication method for equipment in airborne operations comprises:

checking whether the data to be transmitted by the first emitting module matches with the data to be transmitted by the second emitting module, and:
discarding the data without sending it through the first main channel and through the second main channel if the data to be transmitted by the first emitting module does not match with the data to be transmitted by the second emitting module, or;

sending the data through the first main channel and through the second main channel if the data to be transmitted by the first emitting module matches with the data to be transmitted by the second emitting module.

Furthermore, according to a preferred embodiment of the present invention, the communication method further comprises:

checking whether the data received through the first main channel by the first receiving module matches with the data received through the second main channel by the second receiving module, and:

discarding the data without processing it if the data received by the first receiving module does not match with the data received by the second receiving module, or;

processing the data if the data received by the first receiving module matches with the data received by the second receiving module.

As already mentioned, "processing the data" may involve forwarding the data to an actuator in an aircraft or to a central computer.

According to a preferred embodiment, the communication method comprises sending the data through the corresponding first main channel and second main channel by splitting, within each main channel, logic 0's and 1's into two different subchannels.

The present invention further refers to a computer implemented method for transmitting information (data) between equipment in airborne operations.

The computer implemented method comprises performing the following steps in a first emitting module and in a second emitting module of a first double transceiver:

comparing a first sensor signal received by the first emitting module from a first sensor with a second sensor signal received by the second emitting module from a second sensor and, if the first sensor signal is equal to the second sensor signal, generating a bitstream corresponding to the received sensor signal, the bitstream further corresponding to a main signal which is to be transmitted by the corresponding emitting module through a corresponding main channel;

converting the bitstream into an analogue signal, where logic 1's of the bitstream are allocated a first voltage and logic 0's of the bitstream are allocated a second voltage;

splitting the analogue signal into a first secondary signal and a second secondary signal, wherein each secondary signal has a frequency corresponding to either the first voltage or the second voltage of the analogue signal, wherein the frequency of each secondary signal respectively corresponds to a first subchannel and a to a second subchannel of the corresponding main channel, and;

amplifying the first secondary signal and the second secondary signal of the corresponding main signal.

The computer implemented method further comprises performing the following steps in a first receiving module and in a second receiving module of a second double transceiver respectively receiving the amplified main signal through the corresponding main channel:

lowering a carrier frequency of the first secondary signal and the second secondary signal of the corresponding main signal;

amplifying the first secondary signal and the second secondary signal in the selected lowered carrier frequency;

generating a demodulated signal from the first secondary signal and the second secondary signal according to an envelope detection of the amplified first secondary signal and the second secondary signal;

converting the demodulated signal into a bitstream;

generating an LO command signal based on the bitstream, and;

applying the LO command signal to command the lowering of the carrier frequency of the first secondary signal and the second secondary signal.

According to a preferred embodiment of the computer implemented method, the bitstream generated in the first emitting module and in the second emitting module includes a code corresponding to an emission power at which the first main signal and the second main signal are to be transmitted respectively by the first emitting module and by the second emitting module, respectively through the first main channel and through the second main channel.

Thus, the computer implemented method includes, within the first emitting module and the second emitting module, amplifying the first secondary signal and the second secondary signal of the corresponding main signal at the emission power indicated by the generated bitstream.

The abovementioned feature allows for adapting the emission through the first main channel and through the second main channel to any possible EMCON restriction which may be imposed to the airborne operation.

The present invention also refers to a computer program comprising instructions that, when executed in a computer, perform the computer implemented method described above.

The present invention further refers to a computer readable medium comprising instructions that, when executed in a computer, allows the computer to perform the computer implemented method described above.

Thus, the present invention implements a duplex communication with the central computer of system (located at the tanker) to manage the information from sensors and commands to actuators placed into mobile part via wireless communication without any traditional wires. The power required for these sensors and actuators is supplied via an intermediate energy storage allowing the self-powered system.

The system and method of the present invention allows the reduction of complexity of traditional wiring system:
  In boom system: The spring wiring system required for this equipment that works in a fuel environment in term of complexity, weight and isolation. Current spring wiring that communicates the mobile part of BOOM to central computer located in tanker aircraft requires a huge maintenance tasks and scheduled removals in order to keep the communications.
  In POD system: no wiring is allowed due to its safety implications required due to fuel environment.

BRIEF DESCRIPTION OF THE DRAWINGS

As a means for better understanding at least one embodiment of the present invention, the following set of drawings is introduced by way of schematic illustration and in a non-limitative manner.

DETAILED DESCRIPTION OF THE PREFERRED EMBODIMENTS

The present invention, as already introduced, refers to a system and a method for powering and transmitting information between pieces of equipment involved in airborne operations, especially in airborne refueling operations.

Figure 1:
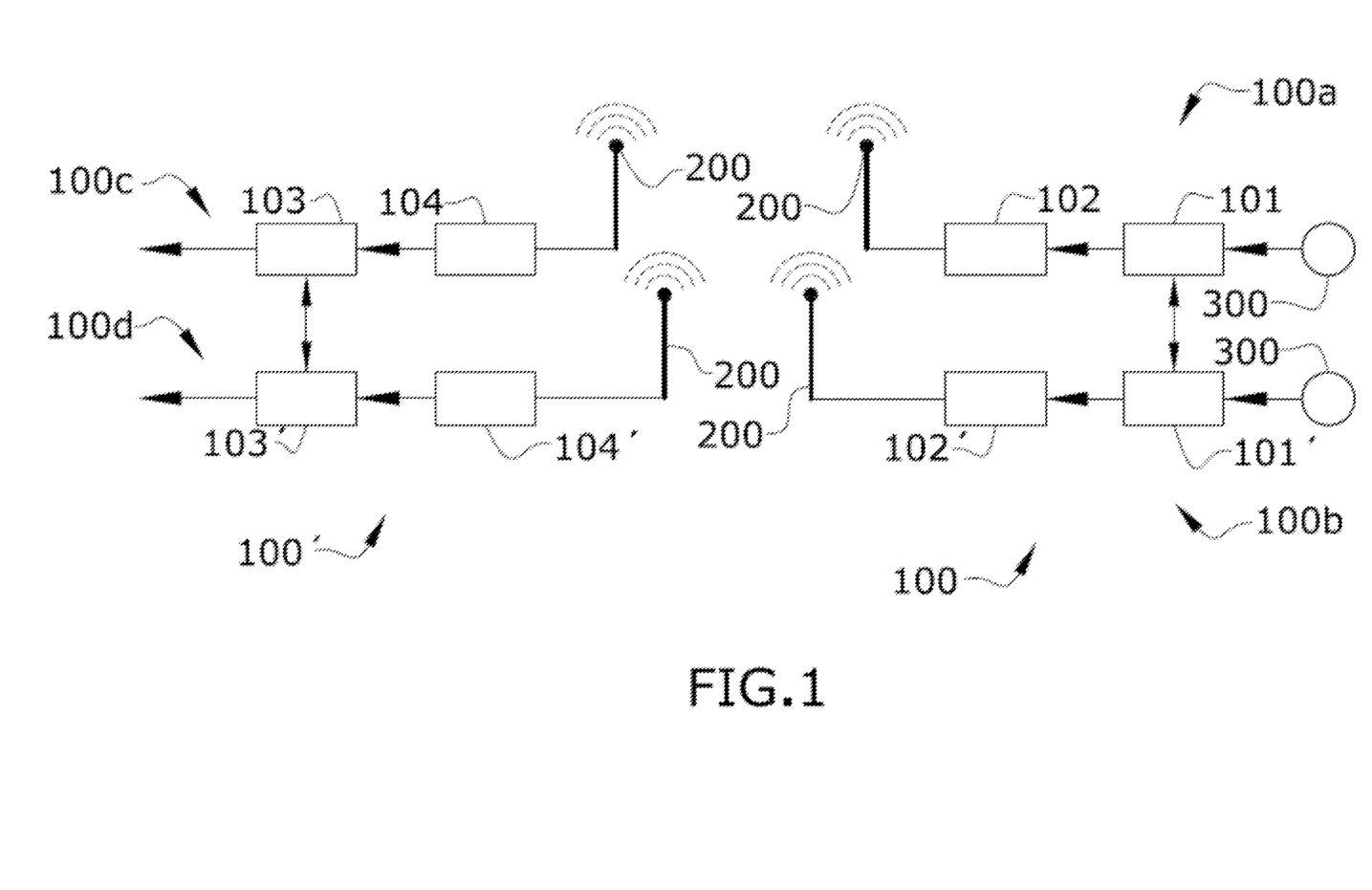
FIG. 1 shows an exemplary view of the basic architecture of the communication system in airborne operations of the present invention.

FIG. 1 shows an exemplary view of the basic architecture of the power and communication system in airborne operations, according to one preferred embodiment of the present invention.

The power and communication system comprises a first double transceiver (100) and a second double transceiver (100').

The first double transceiver (100) is configured to emit and/or receive signals in at least two different channels (main channels).

The first double transceiver (100) has a first emitting module (100a) for emitting signals in a first main channel.

The first double transceiver (100) has a second emitting module (100b) for emitting signals in a second main channel.

The first double transceiver (100) may also have a first receiving module (100c) for receiving signals in the first main channel.

The first double transceiver (100) may also have a second receiving module (100d) for receiving signals in the second main channel.

FIG. 1, however, only shows the first emitting module (100a) and the second emitting module (100b) of the first double transceiver (100), i.e., it only shows the emitting configuration of the first double transceiver (100).

The second double transceiver (100') is configured to receive and/or emit signals in the abovementioned two different main channels.

The second double transceiver (100') has a first receiving module (100c) for receiving signals in the first main channel.

The second double transceiver (100') has a second receiving module (100d) for receiving signals in the second main channel.

The second double transceiver (100') may also have a first emitting module (100a) for emitting signals in the first main channel.

The second double transceiver (100') may also have a second emitting module (100b) for emitting signals in the second main channel.

FIG. 1, however, only shows the first receiving module (100c) and the second receiving module (100d) of the second double transceiver (100'), i.e., it only shows the receiving configuration of the second double transceiver (100').

The first emitting module (100a) and the second emitting module (100b) may either be connected to a sensor (300) (e.g., a pressure sensor in a hose or pipe in a BOOM refueling system or a probe-and-drogue refueling system) or to a central computer (not shown) onboard an aircraft (e.g., a tanker aircraft).

The first receiving module (100c) and the second receiving module (100d) may either be connected to an actuator (not shown) (e.g., a valve actuator in a BOOM refueling system or a probe-and-drogue refueling system) or to a central computer (not shown) onboard an aircraft (e.g., a tanker aircraft).

The first emitting module (100a) is configured to emit signals in two different subchannels of the first main channel.

The second emitting module (100b) is configured to emit signals in two different subchannels of the second main channel.

The first receiving module (100c) is configured to receive signals in the two different subchannels of the first main channel.

The second receiving module (100d) is configured to receive signals in the two different subchannels of the second main channel.

The first emitting module (100a) comprises: a control submodule (101) and a first radio frequency (RF) submodule (102).

The second emitting module (100b) comprises: a monitoring submodule (101') and a second radio frequency (RF) submodule (102').

As already introduced, the control submodule (101) of the first emitting module (100a) may be connected to a sensor (300), for example, a pressure sensor for measuring the fuel pressure in the hose or duct for refueling an aircraft.

The monitoring submodule (101') of the second emitting module (100b) may be connected to another sensor (300) for measuring the same magnitude (for example, pressure) as the sensor (300) connected to the control submodule (101) of the first emitting module (100a).

The control submodule (101) is bidirectionally connected to the monitoring submodule (101'), so that the magnitude measured by the sensor (300) connected to the control submodule (101) can be compared with the magnitude measured by the sensor (300) connected to the monitoring submodule (101'). Should both magnitudes not coincide, the first double transceiver (100) (and/or the second double transceiver (100')) is configured to discard both magnitudes measured by the two sensors (300) and wait for the next two magnitudes measured by the two sensors (300). Should the magnitudes measured by the two sensors (300) coincide, the first double transceiver (100) (and/or the second double transceiver (100')) is configured to transmit the magnitude in the two main channels.

Thus, when the magnitudes measured by the two sensors (300) coincide (i.e., it is one and the same magnitude measured by the two sensors (300)), the magnitude is transmitted in a redundant manner, in two different main channels.

The first radio frequency submodule (102) and/or the second radio frequency submodule (102') are configured to transform the measured magnitude into a RF signal to be transmitted in two different subchannels, as will be explained below.

The first receiving module (100c) comprises: a control subblock (103) and a first radio frequency (RF) subblock (104).

The second receiving module (100d) comprises: a monitoring subblock (103') and a second radio frequency (RF) subblock (104').

The control subblock (103) of the first receiving module (100c) is bidirectionally connected to the monitoring subblock (103') of the second receiving module (100d), so that the magnitude received by the first radio frequency subblock (104) can be compared with the magnitude received by the second radio frequency subblock (104'). Should both magnitudes not coincide, the second double transceiver (100') (and/or the first double transceiver (100)) is configured to discard both magnitudes received by the two radio frequency subblocks (104, 104') and wait for the next two magnitudes to be received by the two radio frequency subblocks (104, 104'). Should the magnitudes received by the two radio frequency subblocks (104, 104') coincide, the second double transceiver (100') (and/or the first double transceiver (100)) is configured to process the received magnitude as correct.

The first double transceiver (100) and the second double transceiver (100') are preferably configured to operate at a frequency range of 2.4-2.5 GHz shared with Bluetooth and Wireless communications.

The first double transceiver (100) and the second double transceiver (100') are configured to send and/or receive the data encrypted due to the sensible data sent through this means.

Moreover, as already introduced, the data transmission by the first double transceiver (100) and by the second double transceiver (100') involves, within a transmission main channel, separating and sending logic 0's and 1's through different subchannels at the same time in order to avoid the jammers.

Within one subchannel, logic 1's are transmitted at a deviated frequency with respect to a carrier frequency, and the gaps between the logic 1's refer to logic 0's, which may be allocated a null deviation with respect to the carrier frequency.

In the other subchannel, logic 0's are transmitted at a deviated frequency with respect to a carrier frequency, and the gaps between the logic 0's refer to logic 1's, which may be allocated a null deviation with respect to the carrier frequency.

Thanks to this strategy, the information (the data) can be reconstructed in the second double transceiver (100') (and/or in the first double transceiver (100)) with only one subchannel in case of a jam.

Furthermore, this control/monitor architecture is required for DAL A operation. For this reason, the first double transceiver (100) and/or the second double transceiver (100') is/are configured to send data based in two redundant main channels (each main channel comprising the mentioned two subchannels for the logic 1's and the logic 0's) for data validation by the second double transceiver (100') and/or by the first double transceiver (100).

The information (data) received through one main channel (by the first receiving module (100c)) is compared with the information (data) received through the other main channel (by the second receiving module (100d)). If the data received through one main channel does not match with the data received through the other main channel, then the data received through both main channels are discarded because of an erroneous data has been transmitted According to one possible embodiment, data are transmitted through three different main channels for data validation. In this case, if the data received through two of the main channels match with each other, and the data received through the third main channel does not match with the data received through the other two main channels, then the data received through the third main channel is discarded and the data received through the other two main channels is considered to be the correct data.

These architectures for the first double transceiver (100) and the second double transceiver (100') allow the flexibility to change parameters and optimize any communication algorithm. This architecture could be certified based on standards for software development in the aircraft safety sector, like RTCA-DO178 or RTCA-DO254, as it is designed as a simple electronics.

The first double transceiver (100) and the second double transceiver (100') are designed to control the power emission by means of a FPGA command due to the constraint introduced by the military standards in order to comply with the Emission Control (EMCON) operations and fuel environment. Both facts (EMCON operation restrictions and fuel environment) impose that the intensity of RF emissions must be kept under a predetermined power threshold.

Figure 2:
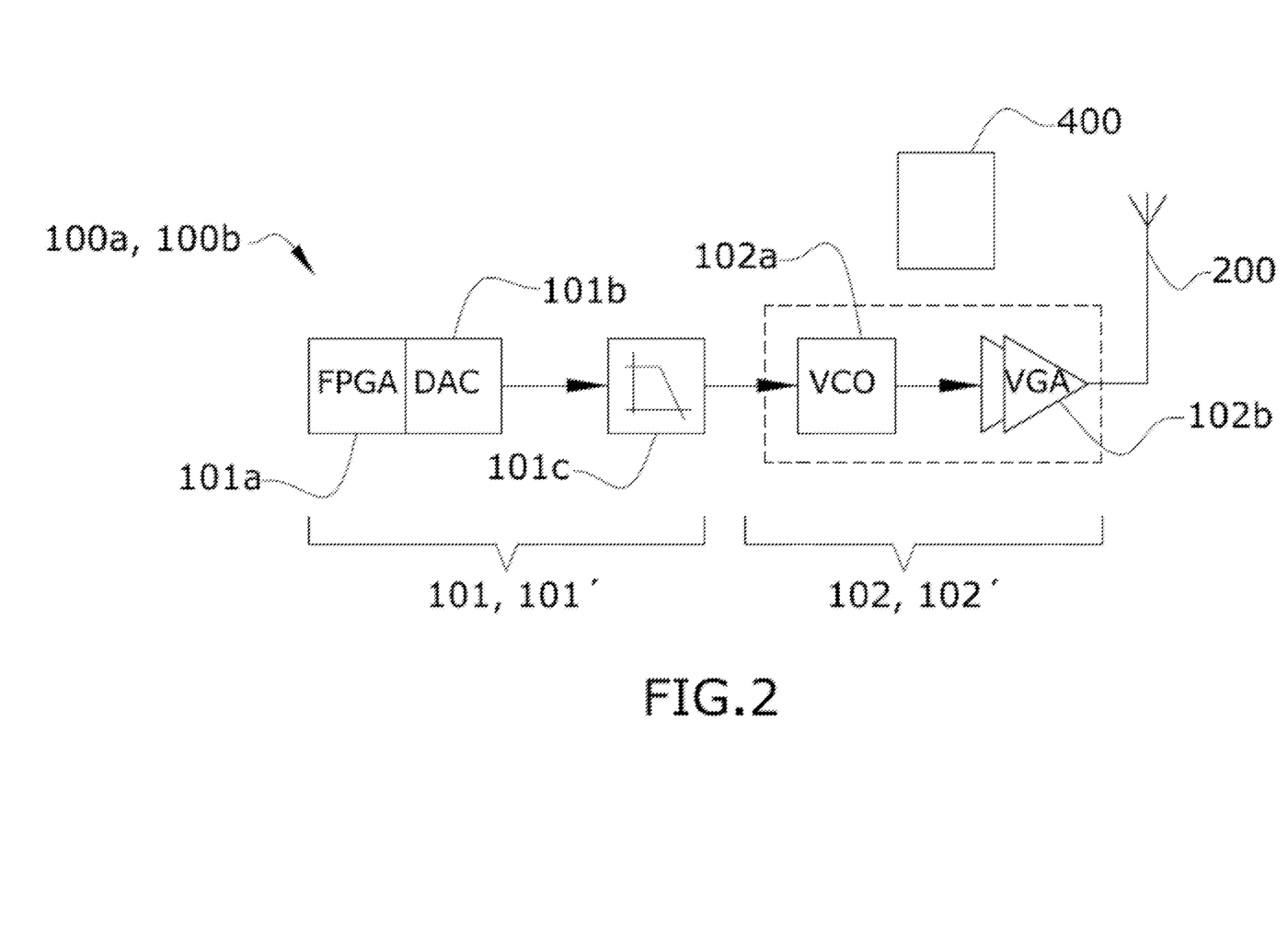
FIG. 2 shows a schematic diagram of one possible embodiment of the architecture of the emitter of the communication system for equipment in airborne operations of the present invention.

FIG. 2 shows one exemplary embodiment of the architecture of either the first emitting module (100a) or the second emitting module (100b).

The control submodule (101) and the monitoring submodule (101') of respectively the first emitting module (100a) and the second emitting module (100b) have the same architecture, namely a first FPGA unit (101a), a digital-to-analogue converter (DAC) (101b), and, optionally, a GFSK unit (101c). A bit stream (representing the magnitude measured by the sensor (300) is converted into an analogue signal, where logic 0's and logic 1's are allocated different voltage values.

The digital-to-analogue converter (101b) outputs a square signal with a first voltage (e.g., 7 V amplitude) corresponding to logic "1s" and a second voltage (e.g., 4 V amplitude) corresponding to logic "0s". This square signal is (optionally) injected into the GFSK unit (101c), producing a smooth-profile "square" signal.

This smooth-profile square signal is injected into a first voltage-controlled oscillator unit (102a) (VCO) of the first radio frequency submodule (102) or the second radio frequency submodule (102'). This smooth-profile square signal has a maximum voltage (e.g., 7 V corresponding to logic "1s"), a minimum voltage (e.g., 4 V corresponding to logic "0s"), and a medium voltage (e.g., 5.5 V).

The first radio frequency submodule (102) and the second radio frequency submodule (102') have the same architecture, namely the abovementioned first voltage-controlled oscillator unit (102a) (VCO) and two variable-gain amplifiers (102b) (VGA).

As already said, the GFSK unit (101c) injects its output signal into the first voltage-controlled oscillator unit (102a) (VCO). The two voltages (corresponding to logic "1s" and logic "0s") of the input signal are converted in the first voltage-controlled oscillator unit (102a) into two frequencies deviated from a carrier frequency. The carrier frequency corresponds to the medium voltage of the output signal of the GFSK unit (101c).

The frequency corresponding to logic "1s" corresponds to one subchannel and the frequency corresponding to logic "0s" corresponds to the other subchannel. Both frequency signals are amplified in the two variable-gain amplifiers (VGA) (102b) and further emitted by an antenna (200).

Furthermore, the two variable-gain amplifiers (102b) (VGA) are also fed by a signal coming directly from the first FPGA unit (101a) indicating the amplifying power for the two subchannels, taking into account the eventual EMCON restrictions. In a preferred embodiment, the signal sent from the first FPGA unit (101a) to the two variable-gain amplifiers (102b) (VGA) has 8 specific bits indicating the amplifying power. Thus, the first emitting module (100a) and the second emitting module (100b) may emit signals at 28 different power levels. This allows for flexibility, depending on the eventual EMCON restrictions.

The antenna (200) is, according to a possible embodiment thereof, a 3.2 dBi antenna. The emitted signals have (according to a possible embodiment) an emitting power of 34 dBm, thereby complying with an EMCON restriction for low emissions covering a range of 1 km.

Figure 3:
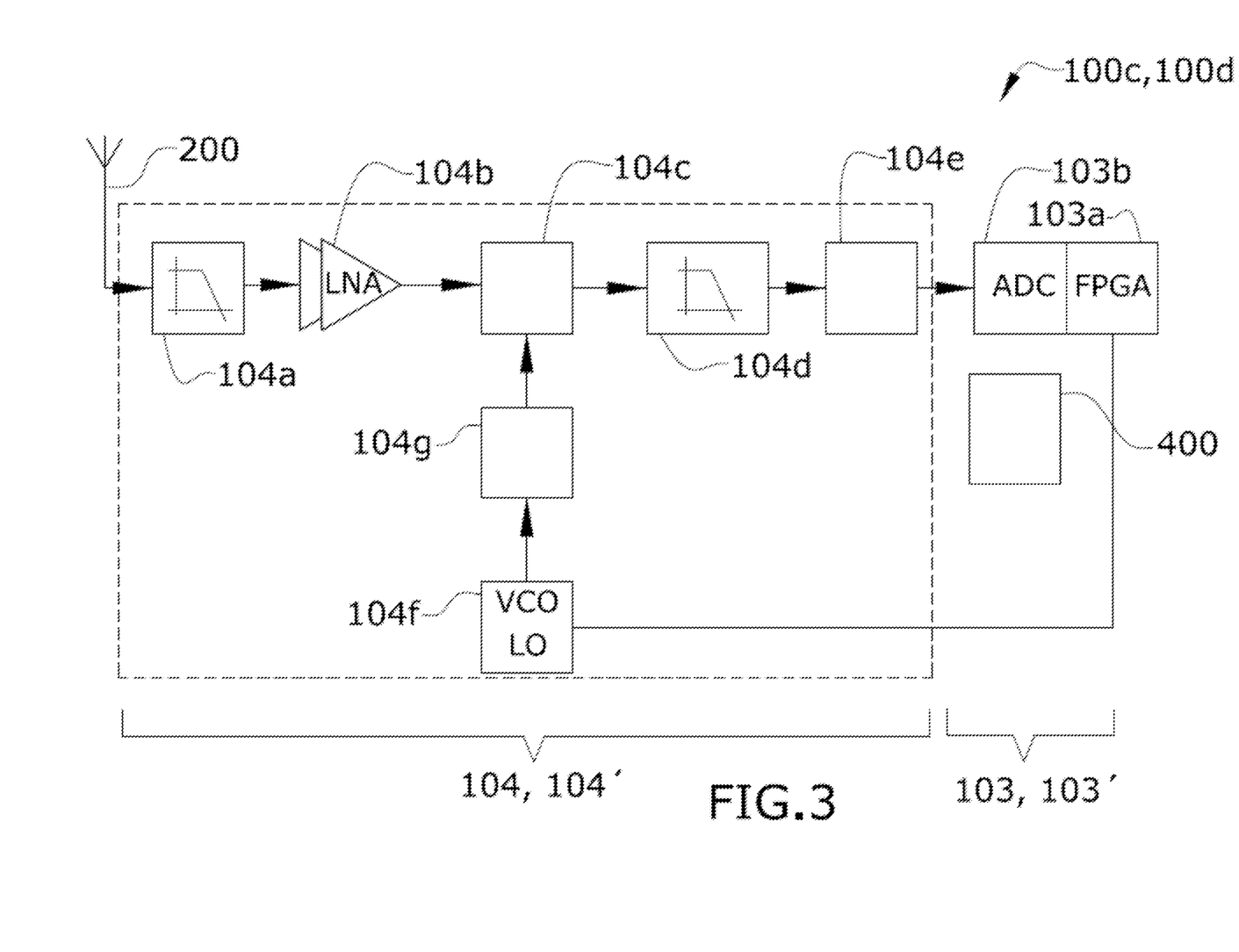
FIG. 3 shows a schematic diagram of one possible embodiment of the architecture of the receiver of the communication system for equipment in airborne operations of the present invention.

The first receiving module (100c) and the second receiving module (100d) of the second double transceiver (100') (and/or of the first double transceiver (100)) are configured to attend the data sent by the first emitting module (100a) and/or by the second emitting module (100b) of the first double transceiver (100) (and/or of the second double transceiver (100')). This data is preferably encrypted due to the integrity required for the data sent through this mean.

The encryption may be made dynamic for increased safety of data transmission.

As already indicated, within each main channel, logic 0's and 1's are separated and sent through different subchannels at the same time in order to avoid the jammers (or even in order to avoid possible noises that could exist at the frequency of one of the subchannels).

Furthermore, control/monitor architecture is implemented for DAL A operation having two redundant channels for data validation.

The first receiving module (100c) and the second receiving module (100d) are configured to reconstruct the information with only one subchannel (of a main channel) in case of a jam.

Furthermore, as already explained, the information (data) is sent in two redundant main channels for data validation, thanks to the control/monitoring architecture. Thanks to this architecture, the power and communication system of the invention is suitable for critical DAL A operation.

The second double transceiver (100') (and/or the first double transceiver (100)) is configured to distinguish and discriminate the possible erroneous data sent by comparison of data received by the 4 subchannels. The second double transceiver (100') (and/or the first double transceiver (100)) may be configured to compare and discard mismatching data, or even compare and discriminate which data is correct.

FIG. 3 shows one exemplary embodiment of the architecture of either the first receiving module (100c) or the second receiving module (100d) of the second double transceiver (100') (and/or of the first double transceiver (100)).

The control subblock (103) and the monitoring subblock (103') of respectively the first receiving module (100c) and the second receiving module (100d) have the same architecture, namely a second FPGA unit (103a) and an analogue-to-digital converter (103b) (ADC).

Furthermore, the first radio frequency block (104) and the second radio frequency block (104') of either the first receiving module (100c) and the second receiving module (100d) have the same architecture, namely a low-pass filter (104a) (LPF), two low-noise amplifiers (104b) (LNA), a mixer (104c), a tuned amplifier (104d), an envelope detector (104e), a second voltage-controlled oscillator unit (104f) (VCO) and an amplification unit (104g).

An antenna (200) (a 3.2 dBi antenna, according to one possible embodiment) is connected to the low-pass filter (104a) (LPF).

The antenna (200) receives a data signal at a preferred frequency of, e.g., 2.4 GHz and a power of 95/105 dBm.

The low-pass filter (104a) is configured to only allow the passage of signals below a preferred frequency, e.g., 2.5 GHz.

The low-pass filter (104a) is connected to two low-noise amplifiers (104b) (LNA) which are configured to amplify the received signal (for example at a rate of 90 dB), discarding all frequencies out of a predetermined range (according to a possible embodiment, the low-noise amplifiers (104b) only amplify signals in the range of 1 to 10 GHz).

The two low-noise amplifiers (104b) output a signal (of a power of, e.g., 58 dBm) which is injected as a RF signal into the mixer (104c).

The mixer (104c) is a downconverter which is configured to lower the carrier frequency of the received signal, according to a LO signal which is also injected into the mixer (104c). The LO signal comes from a control loop, from the second FPGA module (103a), as will be described later.

According to one possible implementation, the LO signal may have a power of 17.5 dBm and the IF signal output from the mixer (104c) has a power of 68 dBm.

The IF signal output from the mixer (104c) is injected into the tuned amplifier (104d) (which has a band-pass filter function and an amplifying function). According to one possible embodiment, the tuned amplifier (104d) has a resonant frequency of 200 kHz and has a bandwidth of 400 kHz centered in the resonant frequency. The tuned amplifier (104d) amplifies the resonant frequency at a 30 dB ratio, and attenuates frequencies out of the bandwidth range at a ratio of 80 dB/dec.

The tuned amplifier (104d) is connected to the envelope detector (104e).

The signal which is output from the tuned amplifier (104d) (and which has a power of, e.g., 38 dBm) is injected as an incoming signal into the envelope detector (104e).

The envelope detector (104e) is configured to distinguish between the different frequencies of the incoming signal (0's and 1's subchannels) and output an analogue signal whose amplitude varies depending on whether a frequency of the incoming signal corresponds to a logic "0" or to a logic "1".

The envelope detector (104e) is connected to the analogue-to-digital converter (103b) (ADC) which in turn is connected to the second FPGA module (103a).

As already introduced, the second FPGA module (103a) is configured to output a control loop signal which is injected into the second voltage-controlled oscillator unit (104f) (VCO) which is configured to produce a local oscillation signal (LO) which is amplified in the corresponding amplification unit (104g) and injected into the mixer (104c), as explained before.

The control loop is used to selectively change between the two subchannels.

Furthermore, the first receiving module (100c) and the second receiving module (100d) are configured to compare the data received through the two main channels for validation purposes.

In case it is detected that the data (e.g., a data indicating a certain pressure within the hose) received from one main channel does not match with the data received from the other main channel, the data may be discarded and the receiver waits for the reception of the next data (e.g., the next pressure data).

There is preferably a tabulated range of correct data (e.g., a tabulated range of expected pressures). Should the received data not fall within the tabulated range, then the data is discarded as erroneous and the receiver waits for the reception of the next data.

The first receiving module (100c) and the second receiving module (100d) may be configured to check (by means of an EDAC ("Error Detection and Correction") module (not shown in the figures)), whether the data received through a first main channel is presumably correct (e.g., by checking whether the data falls within the mentioned tabulated range of correct data). Should the data received through the first main channel be presumably correct, the first receiving module (100c) and the second receiving module (100d) are configured to check whether the data received through the second main channel matches the data received through the first main channel. Should both data not match, both data are discarded as erroneous. If the EDAC module determines that the data received through the first main channel is incorrect, then the data received through the first main channel and second main channel is discarded as erroneous and the receiver waits for the reception of the next data.

The power and communication system of the invention comprises an intermediate energy storage module (400) configured to supply the power required for the sensors and actuators placed into mobile part of the boom or pod refueling system.

The energy storage module (400) is preferably based on ultra-capacitors.

The energy storage module (400) is configured to be charged while the POD or boom system is not operated and is in fully retracted position.

Thus, the energy storage module (400) performs an intermediate energy storage function which allows the self-powering of equipment (sensors and actuators (e.g., valve actuators)) placed in POD or boom mobile parts for a predetermined period of time that is defined as a "nominal operation" of the refueling system (POD and Boom).

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A communication system for equipment in airborne operations comprising:
at least one first double transceiver, wherein the at least one first double transceiver comprises a first emitting module and a second emitting module, wherein the first emitting module comprises a control submodule, a first radio frequency submodule and an antenna, and wherein the second emitting module comprises a monitoring submodule, a second radio frequency submodule and an antenna;
wherein the first emitting module is configured to transmit data thorough a first main channel and the second emitting module is configured to transmit the same data through a second main channel;
wherein the control submodule is bidirectionally connected to the monitoring submodule for checking whether the data to be transmitted by the first emitting module matches with the data to be transmitted by the second emitting module, and wherein the at least one first double transceiver is configured to discard the data without sending the data through the first main channel and through the second main channel if the data to be transmitted by the first emitting module does not match with the data to be transmitted by the second emitting module, and;
at least one second double transceiver, wherein the at least one second double transceiver comprises a first receiving module and a second receiving module, wherein the first receiving module comprises a control subblock, a first radio frequency subblock and an antenna, and wherein the second receiving module comprises a monitoring subblock, a second radio frequency subblock and an antenna;

wherein the first receiving module is configured to receive data thorough the first main channel and the second receiving module is configured to receive data through the second main channel;

wherein the control subblock is bidirectionally connected to the monitoring subblock for checking whether the data received by the first receiving module matches with the data received by the second receiving module, and wherein the at least one second double transceiver is configured to discard the data received through the first main channel and through the second main channel without processing the data, if the data received by the first receiving module does not match with the data received by the second receiving module.

2. The communication system according to claim 1, wherein the first double transceiver and the second double transceiver are configured to operate at a frequency of between 2.4 GHz and 2.5 GHz.

3. The communication system according to claim 1, wherein the first emitting module and the second emitting module are configured to respectively send the data to the first receiving module and to the second receiving module through the corresponding first main channel and second main channel by splitting, within each main channel, logic 0's and 1's into two different subchannels.

4. The communication system according to claim 1, wherein the first emitting module and the second emitting module are connected to respective sensors for measuring one and the same magnitude.

5. The communication system according to claim 1, wherein the first receiving module and the second receiving module are connected to an actuator in an aircraft.

6. The communication system according to claim 1, further comprising at least one of a first double transceiver connected to a central computer in an aircraft or a second double transceiver connected to a central computer in an aircraft.

7. The communication system according to claim 1, further comprising one or more energy storage modules to provide energy to at least one of
the at least one first double transceiver,
the at least one second double transceiver,
a sensor in an aircraft, or
an actuator in an aircraft,
wherein the one or more energy storage modules are configured to be recharged when the communication system is not in use.

8. The communication system according to claim 7, wherein each energy storage module comprises a plurality of ultra-capacitors.

9. The communication system according to claim 1, wherein the first emitting module and the second emitting module of the first double transceiver comprise:
a first FPGA unit of either the control submodule or the monitoring submodule, wherein an emitter FPGA module is connected to an antenna;
a digital-to-analogue converter of either the control submodule or the monitoring submodule, wherein the digital-to-analogue converter is connected to an antenna;
a first voltage-controlled oscillator unit of the radio frequency submodule, wherein the first voltage-controlled oscillator unit is connected to an antenna;
two variable-gain amplifiers of the radio frequency submodule, wherein the two variable-gain amplifiers are connected to an antenna; and
wherein the first receiving module and the second receiving module of the second double transceiver comprise:
an antenna, wherein the antenna is connected to an amplifying unit;
a low-pass filter of the radio frequency subblock, wherein the low-pass filter is connected to the amplifying unit;
two low-noise amplifiers of the radio frequency subblock, wherein the two low-noise amplifiers are connected to the amplifying unit;
a mixer of the radio frequency subblock, wherein the mixer is configured to receive an LO signal from an amplifying unit to which the mixer is connected, and wherein the mixer is further connected to the amplifying unit;
a tuned amplifier of the radio frequency subblock, wherein the tuned amplifier is connected to the amplifying unit;
an envelope detector of the radio frequency subblock, wherein the envelope detector is connected to the amplifying unit;
an analogue-to-digital converter of either the control subblock or the monitoring subblock, wherein the analogue-to digital converter is connected to the amplifying unit;
a second FPGA module of either the control subblock or the monitoring subblock, wherein the second FPGA module is connected to the amplifying unit;
a second voltage-controlled oscillator unit, wherein the second voltage-controlled oscillator unit is connected to the amplifying unit.

10. The communication system according to claim 9, wherein, within each first double transceiver, the digital-to-analogue converter of either the control submodule or the monitoring submodule, is connected to the first voltage-controlled oscillator unit of the radio frequency submodule through a GFSK submodule.

11. A communication method for equipment in airborne operations, the method comprising utilizing the communication system for equipment in airborne operations of claim 1, the method comprising:
checking whether the data to be transmitted by the first emitting module matches with the data to be transmitted by the second emitting module, and:
discarding the data without sending the data through the first main channel and through the second main channel if the data to be transmitted by the first emitting module does not match with the data to be transmitted by the second emitting module, or;
sending the data through the first main channel and through the second main channel if the data to be transmitted by the first emitting module matches with the data to be transmitted by the second emitting module.

12. The communication method according to claim 11, further comprising:
checking whether the data received through the first main channel by the first receiving module matches with the data received through the second main channel by the second receiving module, and:
discarding the data without processing the data if the data received by the first receiving module does not match with the data received by the second receiving module, or;

processing the data if the data received by the first receiving module matches with the data received by the second receiving module.

13. The communication method according to claim 11, further comprising sending the data through the corresponding first main channel and second main channel by splitting, within each main channel, logic 0's and 1's into two different subchannels.

14. A computer implemented method for transmitting information between equipment in airborne operations, comprising performing the following steps in a first emitting module and in a second emitting module of a first double transceiver:
  comparing a first sensor signal received by the first emitting module from a first sensor with a second sensor signal received by the second emitting module from a second sensor and, if the first sensor signal is equal to the second sensor signal, generating a bitstream corresponding to the received sensor signal, the bitstream further corresponding to a main signal which is to be transmitted by the corresponding emitting module through a corresponding main channel;
  converting the bitstream into an analogue signal, where logic 1's of the bitstream are allocated a first voltage and logic 0's of the bitstream are allocated a second voltage;
  splitting the analogue signal into a first secondary signal and a second secondary signal, wherein each secondary signal has a frequency corresponding to either the first voltage or the second voltage of the analogue signal, wherein the frequency of each secondary signal respectively corresponds to a first subchannel and a to a second subchannel of the corresponding main channel, and;
  amplifying the first secondary signal and the second secondary signal of the corresponding main signal; and
performing the following steps in a first receiving module and in a second receiving module of a second double transceiver respectively receiving the amplified main signal through the corresponding main channel:
  lowering a carrier frequency of the first secondary signal and the second secondary signal of the corresponding main signal;
  amplifying the first secondary signal and the second secondary signal in the selected lowered carrier frequency;
  generating a demodulated signal from the first secondary signal and the second secondary signal according to an envelope detection of the amplified first secondary signal and the second secondary signal;
  converting the demodulated signal into a bitstream;
  generating an LO command signal based on the bitstream, and;
  applying the LO command signal to command the lowering of the carrier frequency of the first secondary signal and the second secondary signal.

15. The computer implemented method for transmitting information between equipment in airborne operations according to claim 14, wherein the bitstream generated in the first emitting module and in the second emitting module includes a code corresponding to an emission power at which the first main signal and the second main signal are to be transmitted respectively by the first emitting module and by the second emitting module, respectively through the first main channel and through the second main channel, wherein the computer implemented method includes, within the first emitting module and the second emitting module, amplifying the first secondary signal and the second secondary signal of the corresponding main signal at the emission power indicated by the generated bitstream.

16. A non-transitory computer readable medium comprising a computer program that, when executed in a computer, performs the computer implemented method of claim 14.

17. A non-transitory computer readable medium comprising instructions that, when executed in a computer, perform the computer implemented method of claim 14.

\* \* \* \* \*